(12) United States Patent
Xu (10) Patent No.: US 8,525,997 B1
(45) Date of Patent: Sep. 3, 2013

(54) SYSTEM AND APPARATUS FOR IMPROVED LOW REFLECTANCE COLOR MEASUREMENT

(75) Inventor: Zhiling Xu, Princeton Junction, NJ (US)

(73) Assignee: Datacolor, Inc., Lawrenceville, NJ (US)

( * ) Notice: Subject to any disclaimer, the term of this patent is extended or adjusted under 35 U.S.C. 154(b) by 41 days.

(21) Appl. No.: 13/435,699

(22) Filed: Mar. 30, 2012

(51) Int. Cl.
*G01J 3/52* (2006.01)

(52) U.S. Cl.
USPC .......................................................... 356/421

(58) Field of Classification Search
USPC ................................................. 356/402–425
See application file for complete search history.

(56) References Cited

U.S. PATENT DOCUMENTS 5,956,133 A * 9/1999 Imura ........................... 356/236

* cited by examiner

*Primary Examiner* — Tarifur Chowdhury
*Assistant Examiner* — Abdullahi Nur
(74) *Attorney, Agent, or Firm* — Leason Ellis LLP (57) ABSTRACT

An apparatus and system for providing a solution that enables technicians or other technical professionals obtain an accurate color value for a sample regardless of the reflectance properties. The present invention allows for the generation of high precision reflectance information using improved composite measurements.

18 Claims, 3 Drawing Sheets

SYSTEM AND APPARATUS FOR IMPROVED LOW REFLECTANCE COLOR MEASUREMENT

FIELD OF THE INVENTION

The present invention relates to a system and apparatus for improving the color measurement of low reflectance samples. More particularly, the present invention relates to a spectrophotometer that is configured to compensate for low reflectance properties in a given sample, in part, by boosting the light source intensity and in part by using a plurality of reference samples with low and high reflectance properties.

BACKGROUND OF THE INVENTION

Portable color and appearance measurement systems are used in a variety of industries and disciplines. For example, portable spectrophotometers, such as Datacolor 45G® are useful for inspection and control, among other uses, of painted surfaces, plastic parts, package prints, automotive parts and other manufactured goods. These devices are capable of producing measurement results that correlate better to visual assessment. For items with multiple visible components like home electronics and automobiles, achieving correct color analysis is complicated by the need to visually match large numbers of components, usually with different colors and finishes. Devices in the prior art are calibrated to work on specific materials or within specific operation ranges. This requires additional time and expense to recalibrate devices to make different measurements for different surfaces. As a result, consistent measurements are difficult to obtain in a timely manner.

Spectrophotometers are known and widely used in various technical disciplines. Commonly owned U.S. Published Patent Application No. 2009/031649 and U.S. patent application Ser. No. 13/327,072, which are each hereby incorporated by reference, describe 45/0 spectrophotometers with ring shaped light sources for use in measuring the color of a sample. Spectrophotometers are used for the purposes of measuring and calibrating various sample colors and hues. In these devices, light is reflected off the surface of a sample, measured and recorded with optical sensors. Optical sensors have improved fidelity and reliability over human observation; however, the precision of the current art devices is in need of improvement.

In a typical color measurement device, such as in Datacolor's 45G® spectrophotometer, a sample measurement channel and a reference measurement channel are usually provided. The reference channel is used to compensate any fluctuation of the illumination intensity. The illumination in prior art devices is set at a level wherein both the sample channel signal and reference channel signal are receiving the maximum amount of illumination without oversaturation of the sensors. Usually, prior art optical signal detectors have an optimal range for the signal strength related to the strength of the light captured. If the signal strength falls into that optimal range, the detector will have good signal-to-noise ratio (SNR) and not be saturated. In this context, saturation of the sensor occurs when the sensor has reached its maximum threshold for linear differentiation of intensity. As a result, all measurements above the saturation point must be compensated for sensor nonlinearity, at a possible cost of impaired accuracy. Since the reference channel typically sees a stable signal with small variation, the signal strength of the reference channel is usually set lower than the sample channel so that more illumination can be delivered onto the sample.

Once the illumination of the above-mentioned color measurement device is set, the device provides repeatable and accurate performance when measuring high reflective samples, such as white tile or other bright colors, because both sample channel and reference channel work in the optimal range and have high SNR. However, when measuring low reflectance samples such as black tile or other dark colors, the sample channel signal drops significantly, and thus the SNR in the sample channel will be low. Therefore, prior art devices have worse performance when measuring dark colors as compared to bright colors.

The deficiencies in the prior art render the ability to measure a sample difficult and inconsistent when the sample has low reflectance or dark colors. Therefore, what is needed in the art is a spectrophotometer that provides improved color measurement functions across the illumination spectrum. What is also needed in the art is such a system and apparatus that also allows for precise measurement of low reflectance surfaces. What is further needed is such a system and apparatus that is capable of dynamically adjusting multiple reflectance measurements to achieve accuracy and precision measurements across the wavelength range.

SUMMARY OF THE INVENTION

In accordance with a broad aspect of the present invention, the apparatus disclosed herein provides for an improved spectrophotometer that overcomes the deficiencies inherent in the prior art. In more particular aspects, the present invention provides for a spectrophotometer device wherein a range of illumination conditions can be used to accurately determine the reflectance spectrum of a sample. More particularly, a device so-constructed provides a variable light intensity apparatus in which low reflectance samples are accurately measured by increasing the illumination of a light source, but saturation of the sensor in the sample channel due to presentation of the reference sample is prevented by replacing the usual white reference sample with a gray one. Further advantages can be gained by the inclusion of a light attenuation device. Furthermore, the present device and method described provides for multiple measurements of surfaces and the formation of composite reflectance spectra from a plurality of independent measurements taken under different lighting conditions and with different reference samples.

DESCRIPTION OF ILLUSTRATIVE CERTAIN EMBODIMENTS OF THE INVENTION

By way of overview and introduction, the present invention concerns a system and apparatus to achieve accurate measurement of the color characteristics of a sample measured by a color spectrophotometer. The apparatus and system provide a solution that enables technicians or other technical professionals obtain an accurate color value for a sample even when that sample has a low reflective value. The present invention allows for accurate color analysis of samples by adjusting the illumination of a light source that is reflected off the sample in a manner as described more fully below, and concomitantly by replacing the white reference sample by a gray reference sample. Additionally, one embodiment of the present invention concomitantly attenuates the portion of the light source that is used to provide reference calibration information. The present invention provides a system for generating composite values in low- and high-reflectance portions of the spectrum of a sample, by adjusting illumination conditions and using a white reference sample as well as a gray one. Furthermore, the present invention allows for the color values to be determined using a range of illumination conditions and an analysis mechanism that corrects for the problems associated with low signal to noise ratios inherent in low reflectance sample analysis.

The present invention described in the foregoing figures incorporates a singular light source found within the spectrophotometer. The light source in a particular embodiment is comprised of a plurality of lighting elements; each configured to produce a relatively stable light beam at a given frequency. Alternatively, the light source is configured to provide a variable intensity based on user or automatic control. In a further arrangement of elements, the spectrophotometer described is equipped with a plurality of light sources distributed spatially about the device. It is understood that during the operation of the device herein described, one of the light source varieties is activated. Regardless of the controlled variability of the light source, the light produced has an inherent variability. This variation in intensity is the result of numerous factors like thermal drift, voltage fluctuation, current fluctuation, mechanical movement and air pressure differentials. Regardless of the mechanism introducing fluctuation, the sample is expected to be stable during the measurement. As such, the light source needs a compensator in order for the measurement to be precise.

The device of the described embodiment is configured to use at least two kinds of optical channels that are typically found in a spectrophotometer: (a) a sample color channel that collects light from the spectrophotometer light source after the light reflects off either the test sample or reference sample (white or gray tile); and (b) a reference channel that collects light from the spectrophotometer light source prior to its interaction with the sample.

The present invention is directed to a device for calibrating and compensating reflectance measurement values that result from measuring color characteristics of the surface of an object. Those skilled in the art will appreciate those specimens and products that are suitable for color measurement. For example, the present invention is configured to measure the reflectance values from smooth, glazed, matte and rough textured surfaces.

Those skilled in the art will also appreciate that the spectrophotometer elements can be modified to fit a number of design constraints. For example, in a particular embodiment the spectrophotometer elements are constructed as a removable module or modules that are separately attached to one another by cables or conduits. Alternatively, the spectrophotometer is formed of components that are suitable to be incorporated into a hand-held portable system such as the Datacolor 45G® spectrophotometer.

Figure 1:
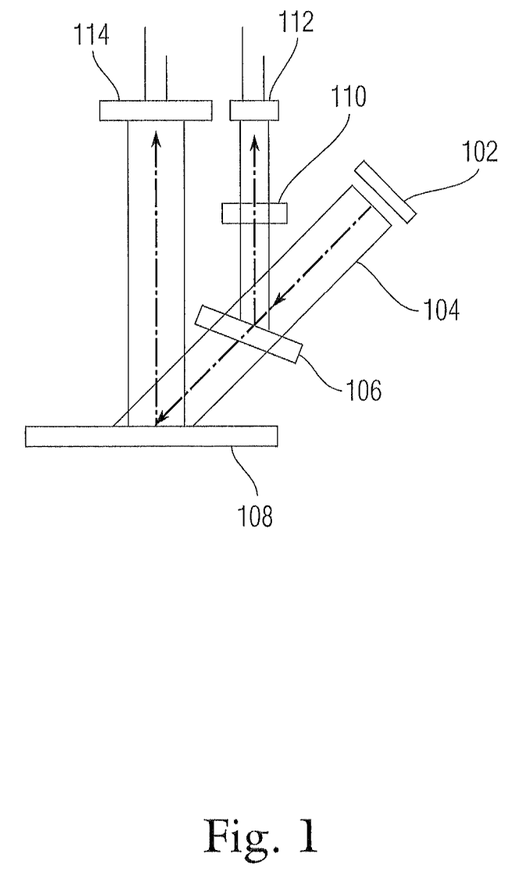
FIG. 1 is an illustrative diagram of the functioning of the device in accordance with one embodiment of the invention.

As shown in FIG. 1, the arrangement of the spectrometer illustrated includes a light source 102. The light source 102 projects a beam of illumination 104 onto a light division device 106 such as a beamsplitter. The light source 102 is configured to produce varying intensities of light depending on the specific testing parameters. In the illustrated embodiment, the light source is a single, white LED lighting element. In alternative arrangements the lighting element is a combination of narrow-band LEDs elements. In a further arrangement, the lighting elements are comprised of other lighting sources, such as tungsten, xenon or florescent lighting elements. All of the light sources incorporated in the illustrated embodiment are variable in intensity depending on the testing parameters. In a particular arrangement, the intensity of the light source 102 is altered by a current limiting electrical circuit. In alternative arrangements the illumination is controlled via programmable or non-programmable digital circuitry.

Upon contact with the light division device 106 a portion of the illumination beam 104 is directed to the color sample 108 and a portion is directed to the attenuator device 110. The light division device 106 can comprise a beam splitter configured to direct light in at least two different directions relative to the incoming beam 104. Those skilled in the art will appreciate the specific mode of operation and construction of the light division device 106. For example, in the illustrated arrangement the light division device 106 is an intensity beam splitter. In alternative arrangements, the light division device 106 comprises a wavelength beam splitter, which passes some wavelengths while reflecting others, or comprises a spatial beam splitter, which passes the central (waist) of the light beam through an optically transparent center region while reflecting the remainder of the beam 104 to the color sample 108.

Two reference samples, a white tile and a gray tile, are tiles of known reflectance that are used to compute the reflectance of any test sample. The function of a reference sample relative to the reference channel can be understood as follows: The reference sample is measured, whereupon the simultaneous measured values of light power (at a wavelength) from the sample and reference channels are IA and IB respectively. The known reflectance value of the reference sample is rR. The test sample is measured, whereupon the simultaneous measured values of light power (at the same wavelength) are IC and ID respectively. The reflectance r of the sample is then computed as rR*(IC/ID)/(IA/IB). When the test sample has a medium-to-high reflectance, the white tile is used as a reference (high value of rR); when the test sample has a low reflectance, the gray tile is used as a reference (lower rR) and light intensity is raised. As such, the device and method described allow for the use of a variable-intensity light, in conjunction with a plurality of reference samples with different reflectances. The use of the color reference samples allows for the spectrometer to be calibrated using a set of standardized values. These values calibrate the spectrometer and allow unknown samples to be identified relative to the known reflectance values.

In those configurations in which the intensity of the light source 102 is high enough to saturate the reference sensor 112 the spectrometer is augmented with an attenuator device 110. The attenuator device 110 is positioned such that it intercepts the light beam prior to its incidence upon the reference channel sensor 112. The attenuator device and reference channel sensor are configured to prevent stray light from the light source 102 from being incident upon the reference channel sensor 112. In one particular arrangement, the attenuator device 110 is a variable fiber optic attenuator. The attenuator device 110 in a given arrangement is controlled manually or electronically by a precision control device. For example, the attenuator device 110 is a variable fiber optic attenuator in which the functions are controlled by a computer. Alternatively, the attenuator device 110 is controlled manually by precision mechanical control and linkages. Those skilled in the art will appreciate the alternative mechanisms and operations of the attenuator device 110 described. The attenuator device 110, when activated, directs a light beam 104 of diminished intensity towards the reference channel sensor 112. This diminished light beam is then incident on the reference channel sensor 112, and produces a corresponding electrical signal.

The reference channel sensor 112 is an industry standard sensor designed to accurately measure the intensity and fluctuation of the light source. In a particular embodiment, the reference sensor 112 is a color sensor re-purposed for the task of compensating the sample reflectance values. The reference channel sensor 112 provides a reference channel that is operational concurrently with a sample color sensor 114. In a given arrangement of the elements in the spectrometer, a lens (not shown) or other light focusing device is suitably placed between the attenuator 110 and the reference channel sensor 112. The light beam 104, when incident upon the reference sensor 112 contains information regarding only the light source and its variability. The electrical signal produced by the reference sensor 112 is used to compensate for the inherent variability found in the illumination beam 104. When combined with the signal from the color sensor 114, it is possible to minimize the inherent variations of the light beam 104 and produce a more accurate color reading of the sample 108. Both the color and the reference sensors operate within an optimal range of illumination values. When the measurement falls below this range, the signal to noise ratio of the measurement renders the output signal undesirable. Likewise, if the illumination intensity is too high, the sensor will become saturated and not provide an accurate reading.

In one arrangement, the reference sensor 112 functions by producing an output that is linearly related to the intensity of the received illumination, when the illumination intensity is below a given threshold. Saturation occurs when the received illumination surpasses the threshold, and the input-output relationship is no longer linear. In this situation, the sensor output can no longer track changes in the input without further correction. Even at saturation, the sensor will continue to respond to an input signal. However, measurements obtained above the saturation threshold will not have true values. For example, when a sensor is saturated it is less capable of distinguishing between values higher than its saturation threshold. Therefore, the attenuator device 110 is positioned to prevent the reference sensor from being oversaturated during low reflectivity measurements.

As seen in FIG. 1, a portion of the light beam 104 passes through the light division device 106, and is reflected off a color sample 108. The reflected beam is incident on at least one color sensor 114. Similar to the reference sensor 112, the color sensor 114 is an industry standard reflectance sensor designed to accurately determine the reflectance spectra (as functions of wavelength) of a color sample 108. In a given arrangement, an optional lens 208 (FIG. 2) is positioned between the sample 108 and the color sample sensor 114.

Once light is incident upon the sensor surfaces (112, 114), electrical signals are output to a computer executing software modules or a custom signal processing hardware that is configured to interpret and analyze the electrical signals generated by the reference and sample sensors. In an alternative arrangement, the sensors output the reference and sample channels through a fiber optic cable or electrical connection (shown in FIG. 3) to an external light processor or computer.

In the arrangement illustrated in FIG. 1, the sample color sensor 114 and optional lens provide a sample spectrophotometer channel for capturing light that has interacted with the sample 108. In the depicted embodiment, the sample has high reflectivity, such as a light color material. In this configuration, the attenuator 110 is set such that the illumination beam directed at the reference sensor 112 is not diminished relative to the light beam 104 that is incident upon the sample channel sensor 114. Additionally, the variable light source 102 is configured to provide the maximum amount of light intensity that still does not saturate the color and reference sensors. In order to properly calibrate the system and apparatus described, a white tile calibrator (not shown) is used to calibrate the color measurement system at each wavelength so that correct reflectance of an arbitrary (but light or highly reflective) sample can be measured. However, when a dark or low reflectance sample is measured in the illustrated device, the given illumination is insufficient to allow for a precise measurement. As such, the illumination is increased so as to boost the signal generated by the sensor. The standard illumination combined with a white tile calibration device will render the sensor saturated. Therefore, a white tile is not used to calibrate the device when a low reflectance or dark color sample is being analyzed. Instead, in an embodiment of the invention wherein a darker color sample analyzed, a low reflectance grey tile calibration is performed. In these calibrations, the intensity of the illumination can be increased compared to that for the white tile calibrator such that the color sensor can achieve an accurate reading.

In a particular arrangement of elements, the reference sensor is used to correct for "flash to flash" deviations in light intensity due to various error inducing circumstances such as thermal drift. The reference sensor 112 outputs the white light reflected from the light division device 106 to a diffraction grating (not shown). The diffraction grating allows for the individual analysis of the component wavelengths of the light source. Likewise, a diffraction grating allows for the analysis of light reflected off the sample and received by the color sensor 114. The diffraction grating configures light into its spectral components for a detailed analysis of each specific wavelength component. In this way, the correction of the flash to flash deviations is accomplished using comparisons specific to each wavelength component. Thus, a more precise correction of the light intensity deviation is achieved.

The process of calibrating a white tile uses measured reflectance values that are compared to stored reflectance values so that the system is able to measure the amount of reflectance of different wavelengths in the visible range at a given interval (e.g. 10 nm). In practice, the white tile is calibrated by a standard device, such as a reflectance standard measuring device operated by The National Research Council Canada. The reflectance results from a standard device are stored and used to calibrate a different device so that different device measures the same value for the same color. For example, a calibration white tile is measured on a standard device in the 360 nm to 750 nm wavelength range at an interval of 10 nm, and the result is stored and used as the known reflectance of the white tile. This known reflectance information is then used to calibrate individual spectrophotometers such as the present device. Furthermore, the calibration of a grey tile operates in a similar manner. It should be noted that each calibration device, e.g., a grey tile or a white tile or otherwise, has its own spectral characteristics. As such, each calibration value is determined by a standards device prior to the deployment of the described arrangement.

Once the spectral characteristics for the white or grey tile are provided to the spectrophotometer, the device calibrates the sensors based on the difference between the received input signal and the known reflectance data obtained from the standards device.

In one operational mode, the spectrophotometer then evaluates the measured signal level of a sample in question as a percentage of reflectance value obtained during the calibration. This percentage of calibration allows for the device in question to determine the proper reflectance at all the wavelengths of the sample and to calculate colors based on this analysis.

Figure 2:
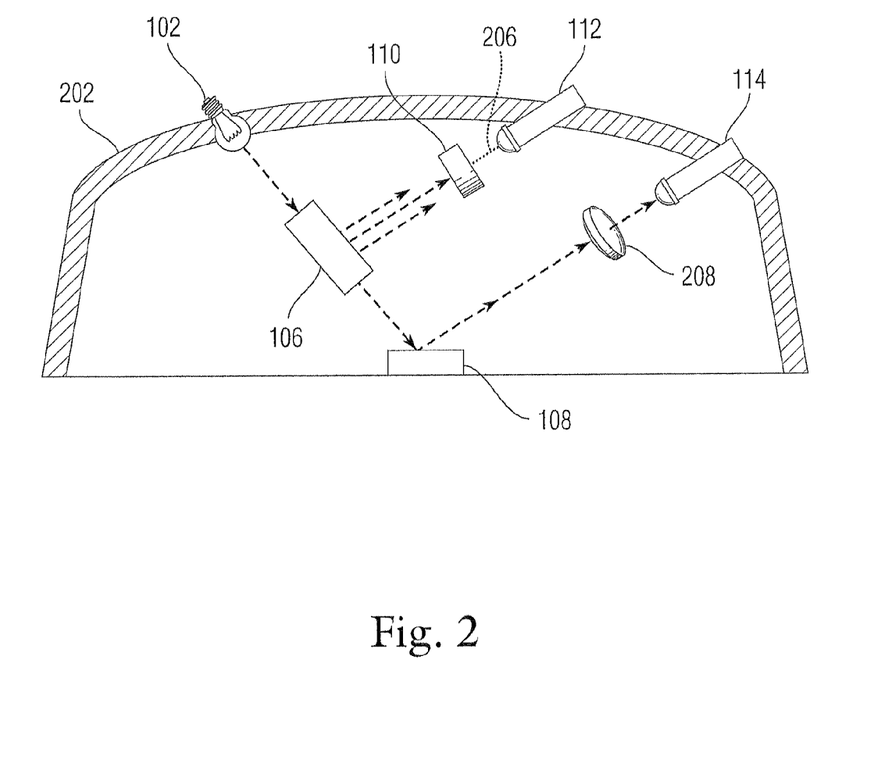
FIG. 2 is an illustrated cross-sectional view of a portion of an embodiment of the invention.

FIG. 2 illustrates an arrangement of the components and elements of the present device wherein the sample 108 is a low reflectance sample. As illustrated, the spectrophotometer incorporates a dome 202, optionally reflective, which supports the various modules and elements. Additionally, the dome 202 provides a suitable environment to ensure that any outside light sources are minimized when analyzing the color sample 108. The dome 202 structure is in no way limiting on the functioning of the present device. Those skilled in the art will appreciate that other complete enclosures and semi-enclosures can be substituted. The light source 102 is configured to provide high illumination. The light deviation device 106 directs separate light beams 104 to the sample 108 and the attenuator 110. Because the light source is configured for high illumination, the attenuator 110 diminishes the light source and produces a reduced intensity beam 206 which is then captured by the reference sensor 112. The light beam reflected off the color sample 108 is focused by a lens 208 and is captured by the color sensor 114. In this configuration, the spectrophotometer is capable of achieving accurate and precise measurements of the reflectance spectra of the sample without oversaturation of the reference sensor or the low SNR ratio inherent in low reflectance measurements.

Figure 3:
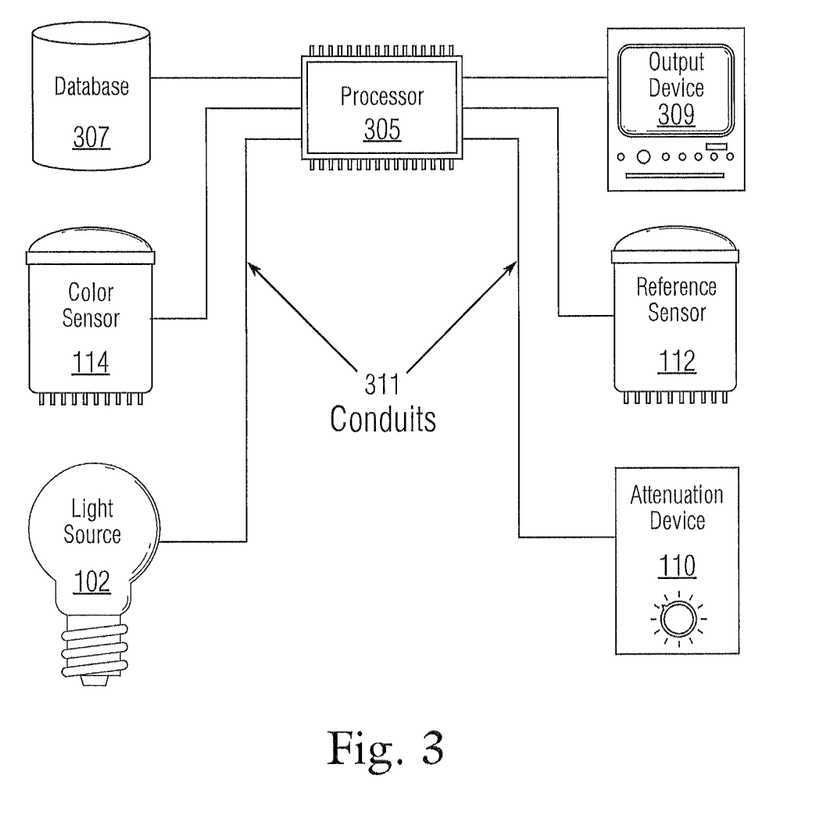
FIG. 3 is a schematic diagram of an embodiment of the invention.

As shown in FIG. 3, the outputs of the reference and sample channels are directed through a fiber optic cable conduit or electrical connection 311 to an external light processor or computer 305 configured to analyze the channel data received into a memory thereof and to be acted upon by a data or signal processor configured by code executing therein to perform the analysis. The elements described are assembled from modular components, thus allowing for ease of manufacture and simplicity of arrangement.

The computer or processor 305 processes the information from the sensors to determine reflectance values using widely understood algorithms. For instance, the computer 305 is equipped to perform and analyze the color and reflectance measurements. The computer 305 is equipped to perform super-ellipsoid measurements, least square fit optimizations, and/or similar computational analysis on the signal channel data. The conduits 311 of the depicted elements are configured to transmit one or more data channels to the computer 305, thereby providing a secure link without additional optical interference. For example, the reflectance sensors described herein are equipped to output each channel on a different modulated frequency Those skilled in the art will appreciate the various computational mechanisms available to computer 305 for obtaining a corrected reflectance value from the data channel inputs.

The processor 305 is configured with I/O (input/output) channels that allow for the control of discrete elements. For example, the functions of the attenuation device 110 are configured and controlled by the processor 305. When the sample to be measured is highly reflective, the illumination source 102 is set to a low intensity setting so as not to saturate the sensor. However, when the sample has low reflectance, the illumination is set to a higher intensity so that a suitable measurement is made. The attenuation device 110 is activated by the processor using information about the light source. In this way, the reference sensor 112 is not saturated. The processor is equipped with an instruction set that allows the attenuation device 110 to be controlled depending on the specific or relative illumination intensity of the illumination source 102. Those skilled in the art will appreciate the various computational algorithms useful for determining the relationship between the attenuation device 110 functions and the illumination intensity of the light source 102. Likewise, the intensity of the light source 102 is also controlled by the processor. Furthermore, the processor 305 is configured to accept instructions from an input device (not shown). In one arrangement of elements, the input device is a real or virtual key pad for inputting values and controlling functions.

In a specific operation of the illustrated device, the processor 305 is pre-configured with set relationship algorithms that govern functions of the attenuation device 110 and the light source. In this arrangement, a user inputs a sample type (e.g. light or dark color), and the present device automatically adjusts the attenuation device 110 and light source 102 so as to achieve the maximum precision. In an alternative operative mode, the sample is analyzed by the both the color and reference sensor and an optimal illumination and attenuation level is set determined algorithmically. In both operational modes, a grey or white calibration values are used to set the original working parameters. In this way, oversaturation of the sensor is avoided and imprecise measurements are minimized. Both the pre-set calibration values as well as the stored measurement values can be stored in a database 307. Likewise, any algorithmic programs for controlling the degree of attenuation by the attenuation device 110 and/or the intensity of the light source 102 are stored and retrieved from the database 307.

In operation, the computer 305 compares the sample channel and the reference channel signals in order to compensate for light source fluctuations. This comparison allows for the reflectance value can then be displayed on an output device 309. Alternatively, the computer 305 is configured to store the values of the compensated measurement and uncompensated measurement for later statistical or analytical investigation in a database. In a further alternative embodiment, the computer 305 is configured to trigger an alarm when the compensation value reaches a certain threshold. In a further embodiment the trigger is a signal generated from the computer that is related to the value of the ratio of the sample channel value to reference channel value and the signal is displayed as a visual token or item on a visual display.

The described spectrophotometer, when combined with suitable computer instructions is configured to provide a composite measurement of a sample having different reflectance values across the wavelengths being used. In this embodiment, an initial illumination provides accurate measurements of the sample's reflectance value at wavelengths in one part of the spectrum, but the illumination introduces signal to noise errors due to the low reflectance of the sample at wavelengths in another part of the spectrum. The present invention is configured to make multiple measurements under different illumination conditions. For example, when high illumination causes certain regions of the spectrum to saturate the sensor, those saturated sensor readings are discarded. Similarly, when a portion of the measurements has a low signal to noise ratio, e.g., due to low intensity, those measurements are likewise discarded. The remaining data, obtained within a more optimal operating range of the sensors, are then combined to provide composite reflectance wavelength spectra.

A particular arrangement of elements also incorporates a method of using the apparatus to carry out and achieve the function of generating a high precision measurement of reflectance by adopting an attenuator and variable light source for use with a sample and reference channel of a spectrophotometer. Such a method involves, but is not limited to, a positioning step, wherein the object or sample to be analyzed is positioned under a spectrophotometer. A calibration step is provided, where a plurality of known reflectance tiles are used to calibrate the device. A measuring step is provided, wherein the sample meter obtains a raw reflectance value of the specimen. A compensation step is provided wherein the spectrophotometer sensor provides a reference channel for the sample meter. A comparison step is provided wherein the illumination reference channel data and the reflectance sample data are compared so as to remove variations due to the specific light element. An attenuation step is provided wherein an attenuator device alters the intensity of a light beam reaching the reference sensor or the light source is directly attenuated by reducing its intensity at the source. A composite step is provided wherein the low usability signals of a plurality of measurements are discarded and the remaining signals are combined to form composite reflectance spectra. In this step the set of data are transformed into a smaller set that satisfy, or do not fail, prescribed criteria. An output step provides a compensated reflectance value in an electronic format ready for storage or transmittal to a display device. The above processing functions can be operating as a series of programmed steps preformed by a properly configured computer system using one or more modules of computer-executable code. For instance, a set of software modules can be configured to cooperate with one another to configure a processor when executed they provide accurate color measurement information to a display device as described herein. In this regard, there can be a measuring module, a compensation module, a comparison module, and an output module.

The calibration step is performed prior to the measurement of the sample. In this arrangement, the attenuation device and associated module are optional. The calibration step allows a user to select either the white tile and/or a gray tile as calibration standards. The calibration step is also configured to allow the selection of at least two light intensities I1 and I2 (where the illumination intensity of I2 is greater than I1) that the light source 102 is capable of producing. The higher light intensity I2 is configured such that a measurement of the grey tile will produce an output in the comfort range of the sample- and reference-channel sensors, for all wavelengths.

For example, the output is between the low end of the dynamic range (where measurements are noisy) and the high end of the dynamic range (where the sensor saturates). The lower light intensity I1 is configured such that the sample channel sensor measurement of the white tile is at all wavelengths within the "comfort range" of the sample channel sensor. If, neither of these conditions is met, then the system is re-calibrated with different I1 and I2 values.

The calibration step is performed by a module incorporating discrete sub-modules designed to calibrate the device depending on the calibration tile used. For example, a white tile calibration sub-module configures the reference sensor at all wavelengths for use with the lower intensity light I1 in combination with the white tile. Likewise a grey tile sub-module provides calibration functions to the spectrophotometer at all wavelengths for a higher intensity light I2, using the gray tile.

The measuring module can be configured as a series of discrete sub-modules designed to access data from a color sensor such as the sensor described in connection with FIGS. 1-3. The measuring module incorporates functions enabling the present apparatus to receive color and reflectance information from light that is incident upon a sample.

A compensation module can be configured as a series of discrete sub-modules designed to access one or more reference or sample sensors and provide an output representing the reflectance data of the sample.

An attenuation module can be configured as a series of discrete sub-modules designed to alter an attenuation device so that the illumination reaching the reference sensor is not sufficient to saturate the sensor. When the sample is dark, requiring an increase in illumination, the reference sensor can be exposed to the increased illumination. The attenuation module limits the amount of light reaching the reference sensor such that the compensation functions are still performed, but the sensor is not saturated. This can be accomplished by passing the reference light beam through an attenuation device.

A comparison module can be configured as a series of discrete sub-modules providing the present invention with the necessary functionality to compare the color sample measurement value with the values obtained from the compensation module. In an embodiment of the present invention, statistical analysis of the reference channel is preformed to identify key data points. These key data points are used to indicate variations of intensity that are due solely to the light source and not to physical conditions of the product.

A composite module can be configured as a series of discrete sub-modules providing the present invention with the necessary functionality to form a composite reflectance spectrum from multiple reflectance measurements of a colored-sample surface. In an embodiment of the present invention, those signals that posses a low signal to noise ratio or are indicative of a saturated sensor are discarded. Those measurements that fall within the sensors comfort range under a variety of lighting conditions are combined to achieve a complete spectra measurement of the sample.

The output module can be configured as a series of discrete sub-modules designed to provide functionality to the present invention. The discrete sub-modules can include instructions for combining the compensated color value and formatting the value for display on a particular display device or for updating a database of reference values and stored values.

Each of these modules can comprise hardware, code executing in a processor, or both, that configures a machine such as the computing system to implement the functionality described herein. The functionality of these modules can be combined or further separated, as understood by persons of ordinary skill in the art, in analogous implementations of embodiments of the invention.

As described above, the spectrophotometer is configured to operate with or without the attenuation device, depending on the parameters of measurement. The methods provided above are configured to cooperate to provide complete measurement functionality to enable a device employing the elements described above to measure both light and dark reflectance samples.

The measurement module described above further includes a sub-module for performing a measurement of reflectance over the selected (for example, visible) wavelength range under lower intensity light I1 for a high reflectance sample. This measurement uses the white tile data as a reference to obtain the sample reflectance spectrum. Likewise, the measurement module includes an additional sub-module for testing a low-reflectance (dark) sample 108, which includes a step of increasing the light intensity to the I2 level and performing a measurement of reflectance over the selected wavelength range under higher intensity light I2 and using the gray tile data as a reference to obtain the sample reflectance spectrum.

In the event that the sample 108 has regions of both high and low reflectance, the composite module cooperates with measurement module to perform a measurement of reflectance over the selected wavelength range under each of the two light intensities I1 and I2. For each light intensity measurement taken, the composite module deletes measurements for any wavelengths at which the measurement is outside the sensor's comfort range and stores the surviving measurements by wavelength in order to merge the surviving measurements to create a complete reflectance spectrum.

In the alternative, when the attenuator device is in use, the selection module provides selection of two light intensities I3 and I4 (I4>I3). The higher intensity light 14 is selected to ensure that the sample channel sensor measurement of the gray tile at all wavelengths is in the "comfort range" of the sensor i.e. between the low end of the dynamic range (where measurements are noisy) and the high end of the dynamic range (where the sensor is saturated). The lower light intensity I3 is configured such that the sample channel sensor measurement of the white tile is at all wavelengths within the "comfort range" of the reference sensor.

In this configuration the calibration module calibrates the spectrophotometer at all wavelengths for lower intensity light I3 using the white tile (whose true reflectance values are known from measurement by a standard device). The calibration module also configures the spectrophotometer at all wavelengths for higher intensity light 14 using the gray tile.

The attenuation module then attenuates the light intensity prior to the gray tile calibration so that the reference channel sensor measurement at all wavelengths under the higher intensity light 14 is in the "comfort range" of the reference sensor 112.

The measurement module includes a sub-module for performing a measurement of reflectance over the selected wavelength range under lower intensity light I3 and using the white tile data as a reference to obtain the sample reflectance spectrum. Likewise, the measurement module includes a sub-module for testing a low-reflectance (dark) sample I4. The attenuation module changes the attenuation performed of the attenuator device 110 so that the reference sensor 112 receives proper light and still works in the "comfort range" of the sensor. The device then performs the standard measurements of the measurement module, such as performing a measurement of reflectance over the selected (for example, visible) wavelength range under higher intensity light I4 and using the gray tile data as a reference to obtain the sample reflectance spectrum.

In situations where there is a test sample with low-reflectance and high-reflectance wavelength ranges, a measurement is made of the reflectance over the selected (for example visible) wavelength range under each of the two light intensities I3 and I4. The composite module deletes measurements for any wavelengths at which the measurement is outside the sensor's comfort range and stores the remaining by wavelengths for each light intensity setting.

One white tile and one gray tile are used for illustration purposes in the measurement processes shown above, but one skilled in art would understand that one white tile and multiple gray tiles can be used to cover a larger dynamic range by combining proper intensity lights.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for measuring the color or reflectance of a sample comprising:
    a plurality of reference targets of known reflectance value, each reference target having a reflective surface, wherein, at all of a selected set of measurement wavelengths, at least one reference target reflects a greater fraction of light projected on its surface than at least one of the other reference targets;
    an activated variable intensity light source having a light output, configured to project light in the direction of one of the plurality of targets and the sample having a color characteristic to be measured;
    at least one color sensor positioned as a sample channel so as to receive light reflected from one of the plurality of targets and sample and output a measured color value;
    at least one reflectance sensor positioned as a reference channel so as to receive light reflected from a light division device prior to contact with one of the target or sample and output a reference value; and
    a processor configured to compare the output from the sample channel to the output of the reference channel and generate a computed measurement value that is substantially free of variations of the activated light source; the processor further configured to compare the known reflectance value of each of the plurality targets to the computed measurement value obtained from at least one of the reference targets and generate an adjustment value; the processor further configured to generate a computed measurement value of a sample and adjust the computed measurement value of the sample by the adjustment value and output the result.

2. The apparatus of claim 1 wherein the light source is further configured to selectively project at least two pre-set light intensities, wherein each pre-set light intensity is configured, when reflected from at least one of the reference targets, to be within an operational range of the color sensor for each of the set of measurement wavelengths.

3. The apparatus of claim 2, wherein at least one of the pre-set light intensities configures the light source to project a maximum intensity of light energy, and the maximum intensity, reflected from at least one of the reference targets, does not exceed an upper bound of an operational range of the reference sensor for each of the set of measurement wavelengths.

4. The apparatus of claim 3, wherein at least one of the pre-set light intensities configures the light source to project a minimum intensity of light energy, and the minimum intensity, reflected from at least one of the reference targets, does not fall below a lower bound of an operational range of the color sensor for each of the set of measurement wavelengths.

5. The apparatus of claim 4, wherein the processor is further configured to connect to a database and store measurement values.

6. The apparatus of claim 5, wherein the processor dynamically alters the light source intensity based on stored data from the database relating to the color of the sample.

7. The apparatus of claim 6, wherein the processor is further configured to compare a plurality of values stored in the database and generate a composite dataset for storage in the database.

8. The apparatus of claim 7, wherein the processor outputs the calibrated reflectance value as a visual indicator on a display device.

9. The apparatus of claim 8 further comprising, an attenuation device, interposed between the reference channel sensor and the light division device and configured to control the intensity of the light traveling to the reference channel sensor.

10. The apparatus of claim 9, wherein the processor is further configured to connect to the light source and the attenuation device, wherein the degree of light attenuation is determined based on the intensity of the light source.

11. The apparatus of claim 10, wherein the reference sensor is further configured to receive a maximum illumination value and wherein the attenuation device is engaged only when the maximum illumination value is reached.

12. The apparatus of claim 11, wherein the relationship between the intensity of the light source and the amount of attenuation preformed by the attenuation device is proportional, in order to keep the reference sample at about the same level of activation.

13. A computer-implemented method for utilizing a particular connection with an electronic device in combining different illumination intensities to achieve a reflectance value of a sample using a spectrometer device having a plurality of known reference value targets, a processor, a memory, an input device, an output device; and a compensation application stored in the memory and executable by the processor, the method comprising:
   generating a sample channel value from a color sensor related to the surface characteristics possessed by at least one of the plurality of reference targets and generating a reference channel value from a reference sensor wherein the reference channel value is related to the variation in the light projected onto the reference target;
   generating a target measurement value based on the comparison of the sample channel value with the reference channel value using the processor by executing the compensation application so as to identify a component of the sample channel value due to intensity variations;
   comparing the target measurement value to the known reflectance value of the target to obtain a calibration value;
   obtaining a sample channel value from a color sensor related to the surface characteristics possessed by the sample and obtaining a reference channel value from a reference sensor wherein the reference channel value is related to the variation in the light projected onto the sample;
   comparing the sample channel value with the reference channel value using the processor by executing the compensation application so as to identify a component of the sample channel value due to intensity variations to obtain a sample measurement value;
   generating a calibrated measurement value by adjusting the sample measurement value with the calibration value; and
   outputting the calibrated measurement value as a visual indicator on a display device.

14. The method according to claim 13, further comprising the steps of:
   altering the intensity of the light projected by the light source based on the known reflectance value of the target.

15. The method according to claim 14, further comprising the steps of:
   attenuating the light reflected onto the reference sensor with a light attenuation device.

16. The method according to claim 15, further comprising the steps of:
   altering the intensity of the light projected by the light source;
   generating a second calibrated color measurement value based on the comparison of the sample channel value with the reference channel value;
   combining the first and second calibrated color measurements to achieve a composite reflectance value; and
   outputting the composite reflectance value.

17. The method according to claim 14, wherein the intensity of the light is altered dynamically.

18. The method according to claim 17, wherein the degree of attenuation of the light is in relation to the intensity of the light.

* * * * *